United States Patent
Lee et al.

(10) Patent No.: US 12,511,057 B2
(45) Date of Patent: Dec. 30, 2025

(54) STORAGE DEVICE AND CONTROL METHOD THEREOF

(71) Applicant: Samsung Electronics Co., Ltd., Suwon-si (KR)

(72) Inventors: Kwangjin Lee, Suwon-si (KR); Kirock Kwon, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/665,884

(22) Filed: May 16, 2024

(65) Prior Publication Data

US 2025/0103216 A1    Mar. 27, 2025

(30) Foreign Application Priority Data

Sep. 26, 2023   (KR) .................. 10-2023-0128832

(51) Int. Cl.
*G06F 12/00*        (2006.01)
*G06F 3/06*         (2006.01)

(52) U.S. Cl.
CPC .......... *G06F 3/0619* (2013.01); *G06F 3/0653* (2013.01); *G06F 3/0659* (2013.01); *G06F 3/0679* (2013.01)

(58) Field of Classification Search
CPC ..... G06F 3/0613; G06F 3/0659; G06F 3/0679
USPC ......................................................... 711/103
See application file for complete search history.

(56) References Cited

U.S. PATENT DOCUMENTS

| | | | |
|---|---|---|---|
| 10,078,546 B2 | 9/2018 | Muchherla et al. | |
| 10,373,692 B2 | 8/2019 | Nagashima | |
| 11,056,211 B1 | 7/2021 | Puthoor et al. | |
| 2012/0297258 A1 | 11/2012 | Flynn et al. | |
| 2022/0277787 A1 | 9/2022 | Alsasua et al. | |
| 2023/0315332 A1* | 10/2023 | Duval | G06F 3/0679 |
| 2024/0069745 A1* | 2/2024 | Kim | G11C 16/08 |
| 2025/0103216 A1* | 3/2025 | Lee | G06F 3/0619 |

FOREIGN PATENT DOCUMENTS

| | | |
|---|---|---|
| KR | 10-1696530 B1 | 3/2015 |
| KR | 10-2021-0008922 A | 1/2021 |
| WO | 2014/003982 A1 | 1/2014 |
| WO | 2020/006060 A1 | 1/2020 |

* cited by examiner

*Primary Examiner* — Mohamed M Gebril
(74) *Attorney, Agent, or Firm* — Harness, Dickey & Pierce, P.L.C.

(57) ABSTRACT

A storage device includes a memory device including a plurality of memory blocks, a temperature sensor measuring an internal temperature of the storage device, and a controller, wherein the temperature sensor measures a program temperature at a point in time of programming data in the plurality of memory blocks, and the controller stores the program temperature of program memory blocks, wherein the controller determines at least one memory block failed to read the data programmed in the plurality of memory blocks, when the program temperature of the error block and a read attempt temperature fall within a driving guarantee temperature range, and the controller is configured to calculate a difference in temperature between the program temperature of the error block and the read attempt temperature, compares the difference in temperature and a guarantee magnitude, to register the error block as a bad block or a refresh candidate block.

20 Claims, 12 Drawing Sheets

STORAGE DEVICE AND CONTROL METHOD THEREOF

CROSS-REFERENCE TO RELATED APPLICATION(S)

This application claims benefit of priority to Korean Patent Application No. 10-2023-0128832 filed on Sep. 26, 2023 in the Korean Intellectual Property Office, the disclosure of which is incorporated herein by reference in its entirety.

BACKGROUND

Various example embodiments of inventive concepts relate to a storage device and a method of controlling the same.

A storage device may include a memory device, and the memory device may include a plurality of memory blocks. The plurality of memory blocks may be divided into a normal operation block, a bad block, a reserved block, and the like. As a result of repeatedly performing programming and reading of data into a normal operation block, the normal operation block may become a read failure block that fails to read the data. Data programmed in the read failure block may be transmitted as a reserved block to prevent loss of the data, and the read failure block may be registered as a bad block to prevent any more data from being programmed. However, a data read failure may occur temporarily according to an internal temperature of the storage device. When a memory block that has failed to read may be uniformly registered as a bad block, even a memory block that has temporarily failed to read may be registered as a bad block and, thus, data may not be programmed to waste a storage space in the memory device.

SUMMARY

Various example embodiments of inventive concepts is to provide a storage device and a method of controlling the same, measuring a program temperature, which is an internal temperature of the storage device, at a point in time of programming data in a memory block, and a read attempt temperature, which is an internal temperature, at a point in time of attempting to read the data programmed in the memory block, and determining whether it corresponds to a temporary read failure using the program temperature and the read attempt temperature, to reduce unnecessary block replacement and prevent (or reduce) consumption of a reserved block.

Some example embodiments of inventive concepts provide a storage device including a memory device including a plurality of memory blocks; a temperature sensor configured to measure an internal temperature of the storage device; and a controller configured to control the memory device and the temperature sensor, wherein the temperature sensor is configured to measure a program temperature at a point in time of programming data in each of the plurality of memory blocks by the controller, and the controller is configured to store the program temperature of program memory blocks of which program temperature is out of a stable range, in the memory device, wherein the controller is further configured to determine at least one memory block failed to read the data programmed in each of the plurality of memory blocks, as an error block, when the program temperature of the error block and a read attempt temperature at a point in time of attempting to read the data programmed in the error block fall within a driving guarantee temperature range, and the error block is not included in the program memory blocks, the controller is configured to register the error block as a bad block, and when the program temperature of the error block and the read attempt temperature fall within the driving guarantee temperature range, and the error block is included in the program memory blocks, the controller is configured to calculate a difference in temperature between the program temperature of the error block and the read attempt temperature, and compares the difference in temperature and a guarantee magnitude, to register the error block as a bad block or a refresh candidate block.

Some example embodiments provide a storage device including a memory device including a plurality of memory blocks; a temperature sensor configured to measure an internal temperature of the storage device; and a controller configured to control the memory device and the temperature sensor, program data in each of the plurality of memory blocks, and read the data programmed to each of the plurality of memory blocks, wherein the temperature sensor is configured to measure a program temperature at a point in time of programming the data to each of the plurality of memory blocks, and a read attempt temperature at a point in time of attempting to read the data programmed to each of the plurality of memory blocks, and wherein the controller is further configured to program the program temperature in the memory device, determine at least one memory block failed to read, among the plurality of memory blocks, as an error block, to calculate a difference in temperature corresponding to a difference between the program temperature of the error block and the read attempt temperature, register the error block as a bad block or refresh the error block as a candidate block, based on the difference in temperature and a guarantee magnitude and whether the program temperature of the error block and the read attempt temperature fall within a driving guarantee temperature range, and start with a refresh operation on the refresh candidate block to re-read data programmed in the refresh candidate block, when an internal temperature of the storage device falls within a stable range.

Some example embodiments of inventive concepts provide a method of controlling a storage device including measuring a program temperature that is an internal temperature of the storage device at a point in time of programming data in a program target block among a plurality of memory blocks included in a memory device; programming the program temperature as a temperature of the program target block, in the memory device, when the program temperature is out of a stable range; measuring a read attempt temperature that is an internal temperature of the storage device at a point in time of attempting to read data programmed in a read target block among the plurality of memory blocks; determining the read target block as an error block, and determining whether the program temperature of the error block and the read attempt temperature fall within a driving guarantee temperature range, when the data programmed in the read target block fails to be read; calculating a difference in temperature corresponding to a difference between the program temperature of the error block and the read attempt temperature, to compare the difference in temperature with a guarantee magnitude; registering the error block as a bad block, when the difference in temperature is smaller than the guarantee magnitude, and registering the error block as a refresh candidate block, when the difference in temperature is greater than the guarantee magnitude, or the program temperature of the error block and the read attempt temperature are out of the driving guarantee temperature range; and starting with a refresh operation on the refresh candidate block, to register the refresh candidate block as a bad block or to program new data in the refresh candidate block, according to a result of re-reading data programmed in the refresh candidate block, when the internal temperature of the storage device falls within the stable range.

BRIEF DESCRIPTION OF DRAWINGS

The above and other aspects, features, and advantages of the present inventive concepts will be more clearly understood from the following detailed description, taken in conjunction with the accompanying drawings, in which.

DETAILED DESCRIPTION

Hereinafter, various example embodiments will be described with reference to the attached drawings.

As described herein, an element that is "on" another element may be above or beneath or adjacent (e.g., horizontally adjacent) to the other element. An element that is on another element may be directly on the other element, such that the element is in direct contact with the other element. An element that is on another element may be indirectly on the other element, such that the element is isolated from direct contact with the other element by one or more interposing spaces and/or structures.

It will be understood that elements and/or properties thereof (e.g., structures, surfaces, directions, or the like), which may be referred to as being "perpendicular," "parallel," or the like with regard to other elements and/or properties thereof (e.g., structures, surfaces, directions, or the like) may be "perpendicular," "parallel," or the like or may be "substantially perpendicular," "substantially parallel," respectively, with regard to the other elements and/or properties thereof.

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

It will be understood that elements and/or properties thereof described herein as being "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

Figure 1:
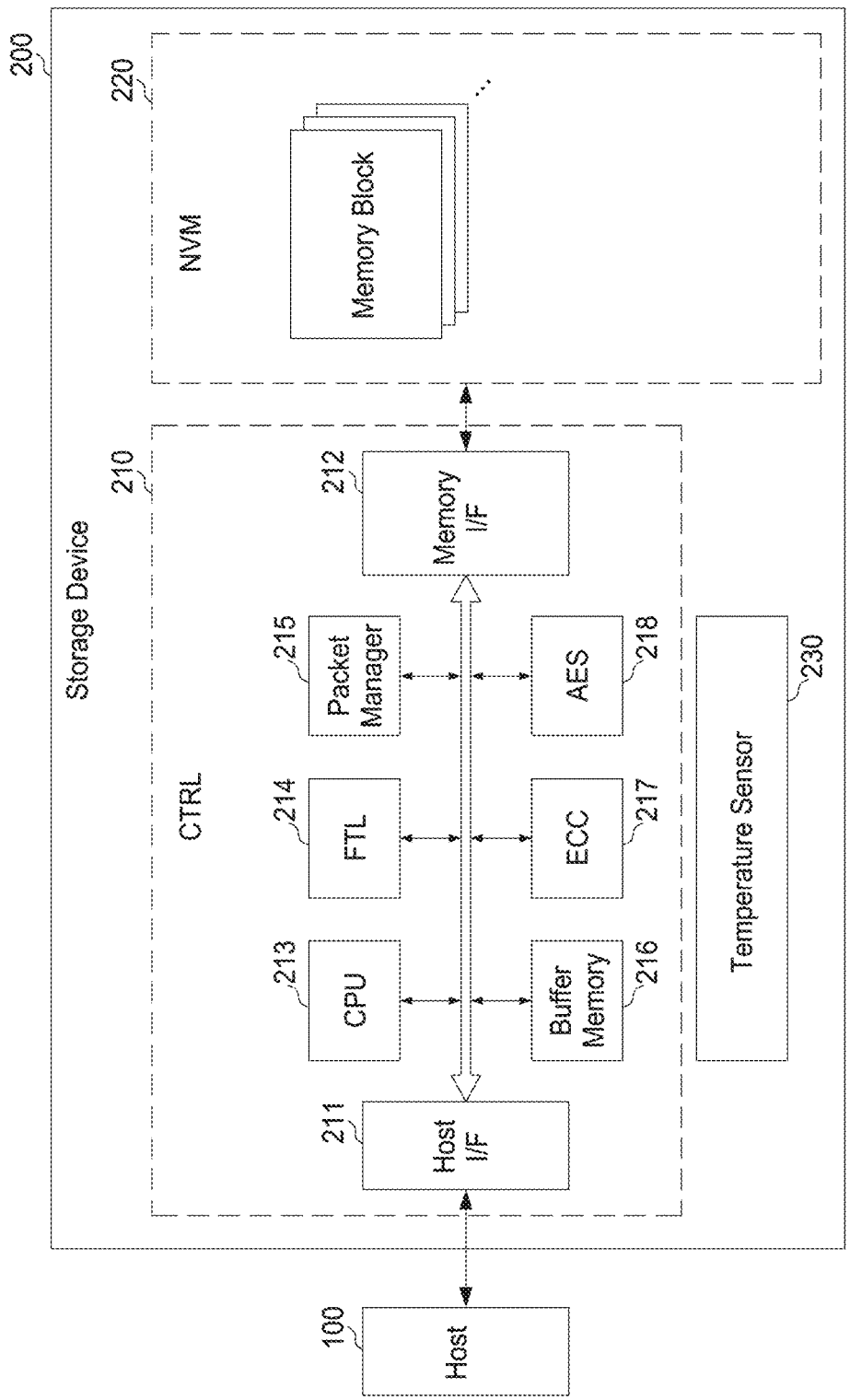
FIG. 1 is a block diagram illustrating a host-storage system according to an example embodiment.

FIG. 1 is a block diagram illustrating a host-storage system according to an example embodiment.

A host-storage system 10 may include a host 100 and a storage device 200. Additionally, the storage device 200 may include a controller 210, a memory device 220, and a temperature sensor 230.

The host 100 may include electronic devices, for example, portable electronic devices such as mobile phones, MP3 players, laptop computers, and the like, or electronic devices such as desktop computers, game consoles, TVs, projectors, and the like. The host 100 may include at least one operating system (OS). The operating system may overall manage and control functions and operations of the host 100.

The storage device 200 may include storage media for storing data according to a request from the host 100. As an example, the storage device 200 may include at least one of a solid state drive (SSD), an embedded memory, or a removable external memory. In some example embodiments, when the storage device 200 is an SSD, the storage device 200 may be a device conforming to a non-volatile memory express (NVMe) standard. In some example embodiments, when the storage device 200 is an embedded memory or an external memory, the storage device 200 may be a device conforming to a universal flash storage (UFS) standard or an embedded multi-media card (eMMC) standard. The host 100 and the storage device 200 may generate and transmit a packet according to an adopted standard protocol, respectively.

The memory device 220 may maintain stored data even when power is not supplied. The memory device 220 may store data provided from the host 100 by a program operation, and may output the data stored in the memory device 220 by a read operation. The memory device 220 may include a plurality of memory blocks, and each of the memory blocks may include a plurality of pages, and each of the pages may include a plurality of memory cells connected to a word line. In an example embodiment, the memory device 220 may be a flash memory.

In some example embodiments, when the memory device 220 of the storage device 200 includes a flash memory, the flash memory may include a 2D NAND memory array or a 3D (or a vertical) NAND (VNAND) memory array. As another example, the storage device 200 may include other various types of non-volatile memories. For example, in the storage device 200, a magnetic RAM (MRAM), a spin-transfer torque MRAM, a conductive bridging RAM (CBRAM), a ferroelectric RAM (FeRAM), a phase RAM (PRAM), a resistive memory (a resistive RAM), and various other types of memory may be applied.

The controller 210 may control the memory device 220 in response to a request from the host 100. For example, the controller 210 may provide data read from the memory device 220 to the host 100, and may program the data provided from the host 100 in the memory device 220.

The controller 210 may include a host interface 211, a memory interface 212, and a central processing unit (CPU) 213. In addition, the controller 210 may further include a flash translation layer (FTL) 214, a packet manager 215, a buffer memory 216, an error correction code (ECC) 217 engine, and an advanced encryption standard (AES) engine 218. The controller 210 may further include a working memory (not illustrated) into which the flash translation layer (FTL) 214 is loaded, and may control program and read operations of data for the memory device 220 by executing the flash translation layer 214 by the CPU 213.

The host interface 211 may transmit and receive a packet to and from the host 100. A packet transmitted from the host 100 to the host interface 211 may include a command, data to be programmed to the memory device 220, or the like, and a packet transmitted from the host interface 211 to the host 100 may include a response to the command, data to be read from the memory device 220, or the like.

The memory interface 212 may transmit data to be programmed to the memory device 220 to the memory device 220, or may receive data to be read from the memory device 220. The memory interface 212 may be implemented to comply with a standard protocol such as a toggle or an open NAND flash interface (ONFI).

The CPU 213 may control an overall operation of the controller 210, and may execute the flash translation layer 214.

The flash translation layer 214 may perform various functions such as address mapping, wear-leveling, and garbage collection. The address mapping operation may be an operation of changing a logical address received from the host 100 into a physical address used to actually store data in the memory device 220. The wear-leveling may be a technique for preventing (or reducing) excessive degradation of a specific block by ensuring that blocks in the memory device 220 are used uniformly, and may be implemented by, for example, a firmware technique for balancing erase counts of physical blocks. The garbage collection may be a technique for securing usable capacity in the memory device 220 by copying valid data of an existing block to a new block and then erasing the existing block.

The packet manager 215 may generate a packet according to an interface protocol negotiated with the host 100, or may parse various types of information from a packet received from the host 100. Also, the buffer memory 216 may temporarily store data to be programmed to or read from the memory device 220. The buffer memory 216 may be provided in the controller 210, but may be disposed outside the controller 210.

The ECC engine 217 may perform an error detection and a correction function on read data read from the memory device 220. More specifically, the ECC engine 217 may generate parity bits for write data to be written into the memory device 220, and the generated parity bits may be stored in the memory device 220, together with the write data. In some example embodiments, when reading data from the memory device 220, the ECC engine 217 may correct an error in read data using parity bits read from the memory device 220, together with the read data, and the error-corrected read data may be output.

The AES engine 218 may perform at least one of an encryption operation or a decryption operation on data input to the controller 210 using a symmetric-key algorithm.

The temperature sensor 230 may measure an internal temperature of the storage device 200. For example, the temperature sensor 230 may measure a program temperature at a point in time of programming data in each of the plurality of memory blocks of the memory device 220 and a read attempt temperature at a point in time of attempting to read the programmed data. The temperature sensor 230 may transmit the program temperature and the read attempt temperature to the controller 210. For example, the controller 210 may store the program temperature in the memory device 220, but is not limited thereto, and the program temperature may be stored in a page or the like.

For example, the point in time of attempting to read may mean a point in time when a read voltage is applied to the memory block. For example, the memory device 220 may determine a memory block to be read based on a read request from the host 100. Thereafter, the memory device 200 may repeatedly apply read voltage sets having different values to read the memory block until it is determined whether read is succeeded or failed, and the point in time when the last set of read voltages is applied may correspond to a point in time of attempting to read.

In some example embodiments, when reading data programmed in each of the plurality of memory blocks fails, the controller 210 may determine whether the memory block that failed to read is processed as a bad block. Causes of read failure may include a defective memory block, an internal temperature condition, or the like of the storage device 200. For example, when the memory block becomes defective, as data is repeatedly programmed to and deleted from the memory block, and reading the data is failed, the memory block may be processed as a bad block. For example, the data stored in the corresponding memory block may be transmitted to a reserved block, and the corresponding memory block may be registered as a bad block such that data may be no longer programmed.

In some example embodiments, when a difference between the program temperature and the read attempt temperature of the storage device 200 satisfies a certain condition, a data read failure may be a temporary phenomenon. For example, when the storage device 200 satisfies an appropriately designed temperature condition, data reading is possible again. Even in this case, when a memory block is consistently processed as a bad block in the same manner as when the memory block become defective, a reserved block may be consumed unnecessarily.

In an example embodiment, in temporary a data read failure due to the internal temperature of the storage device 200, a refresh operation may be performed on a memory block without treating the memory block as a bad block. For example, the memory block may be reused to reduce unnecessary block replacement and prevent (or reduce) consumption of a reserved block.

Figure 2:
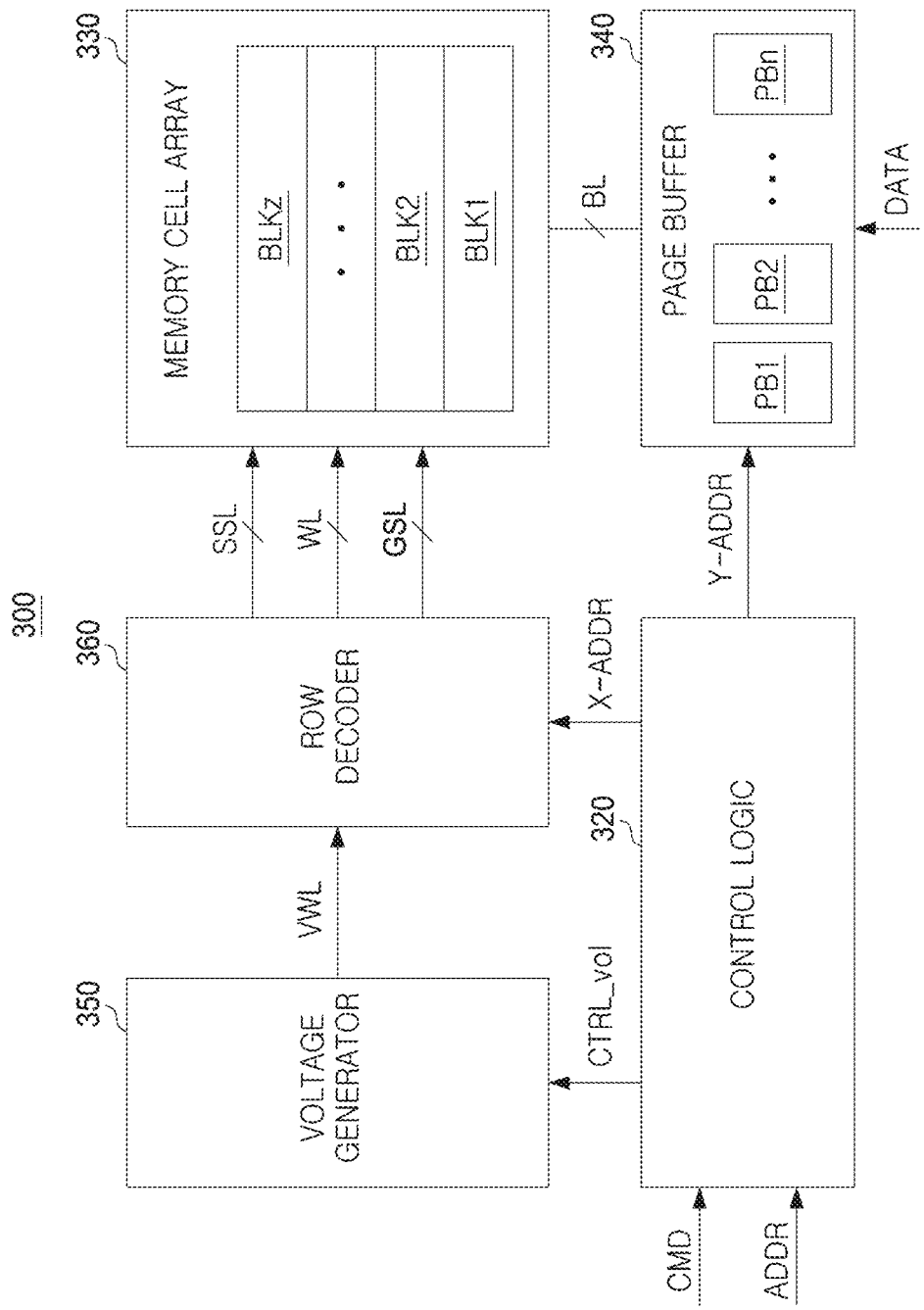
FIG. 2 is a block diagram simply illustrating a memory block according to an example embodiment.
Figure 3:
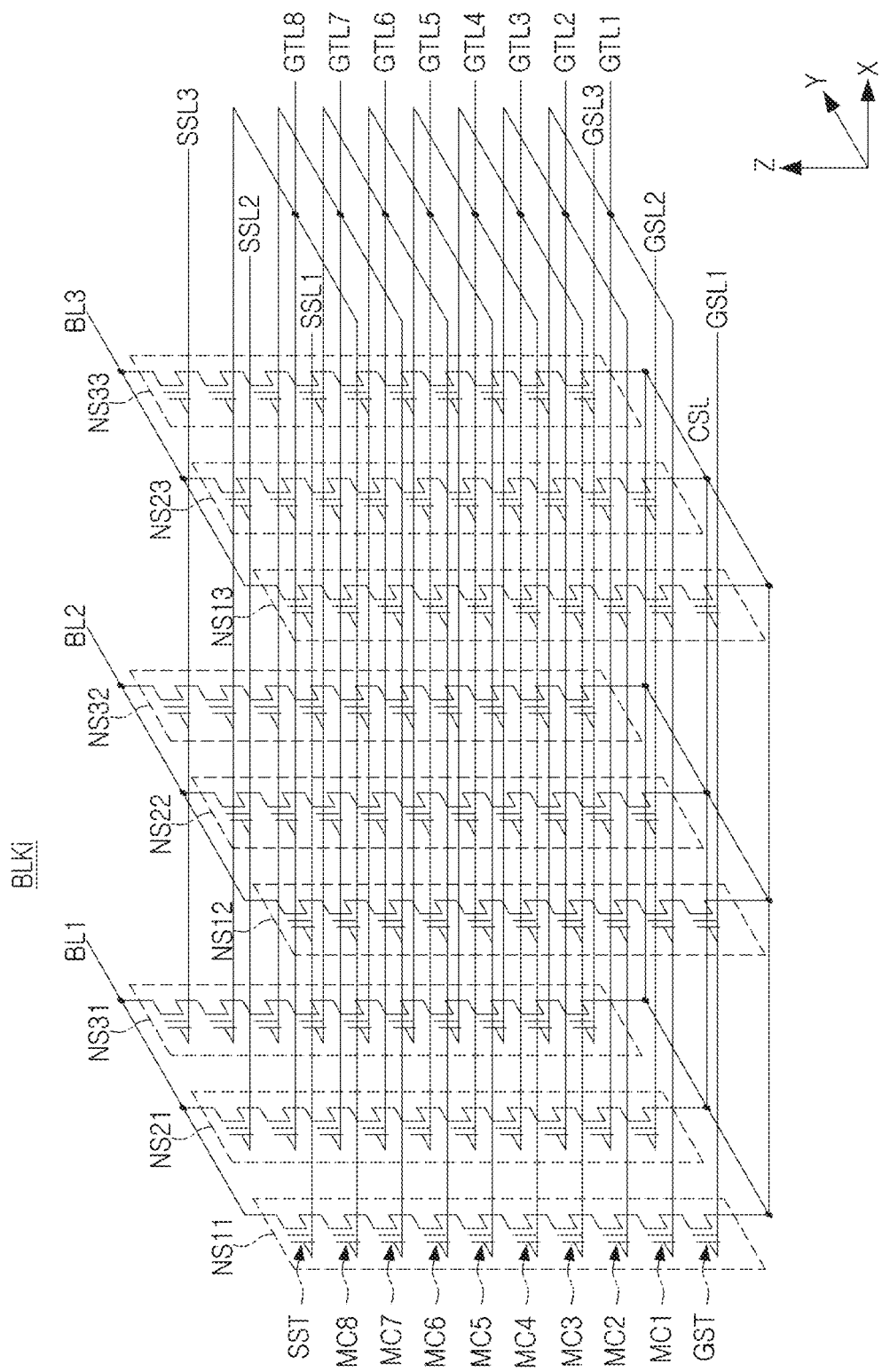
FIG. 3 is a view illustrating a 3D V-NAND structure applicable to a storage device according to an example embodiment.
Figure 4:
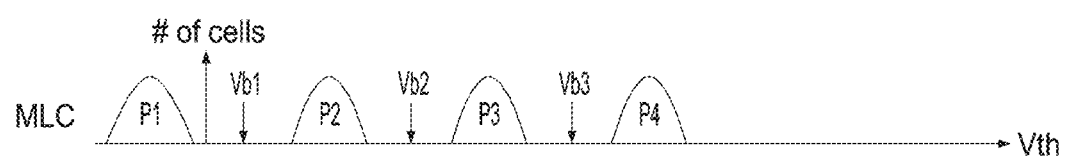
FIG. 4 is a view illustrating threshold voltage distributions of memory cells according to an example embodiment.

Hereinafter, before describing a storage device 200 according to an example embodiment, memory blocks included in the memory device 220 will be described in more detail. FIGS. 2 to 4 are views illustrating memory blocks included in a memory device according to an example embodiment in more detail.

FIG. 2 is a block diagram simply illustrating a memory block according to an example embodiment.

Referring to FIG. 2, a memory device 300 may include a control logic circuit 320, a memory cell array 330, a page buffer 340, a voltage generator 350, and a row decoder 360. Although not illustrated in FIG. 2, the memory device 300 may further include a memory interface circuit receiving a command CMD and an address ADDR externally and exchanging data DATA externally, and also may further include a column logic, a pre-decoder, a temperature sensor, a command decoder, an address decoder, and the like.

The control logic circuit 320 may generally control various operations in the memory device 300. The control logic circuit 320 may output various control signals in response to a command CMD and/or an address ADDR from the memory interface circuit. For example, the control logic circuit 320 may output a voltage control signal CTRL_vol, a row address X-ADDR, and a column address Y-ADDR.

The memory cell array 330 may include a plurality of memory blocks BLK1 to BLKz (where, z is a positive integer), and each of the plurality of memory blocks BLK1 to BLKz may include a plurality of memory cells. The memory cell array 330 may be connected to the page buffer 340 through bit lines BL, and may be connected to the row decoder 360 through word lines WL, string select lines SSL, and ground select lines GSL.

In an example embodiment, the memory cell array 330 may include a 3D memory cell array, and the 3D memory cell array may include a plurality of NAND strings. Each of the NAND strings may include memory cells respectively connected to word lines stacked vertically on a substrate. In an example embodiment, the memory cell array 330 may include a two-dimensional memory cell array, and the two-dimensional memory cell array may include a plurality of NAND strings arranged in row and column directions.

The page buffer 340 may include a plurality of page buffers PB1 to PBn (where, n is an integer greater than or equal to 3), and the plurality of page buffers PB1 to PBn may be respectively connected to memory cells through a plurality of bit lines BL. The page buffer 340 may select at least one bit line among the bit lines BL in response to the column address Y-ADDR. The page buffer 340 may operate as a write driver or a sense amplifier according to an operation mode. For example, during a program operation, the page buffer 340 may apply a bit line voltage corresponding to data to be programmed to a selected bit line. During a read operation, the page buffer 340 may sense data stored in the memory cell by sensing a current or a voltage of the selected bit line.

The voltage generator 350 may generate various types of voltages for performing program, read, and erase operations, based on the voltage control signal CTRL_vol. For example, the voltage generator 350 may generate a program voltage, a read voltage, a program verify voltage, an erase voltage, or the like, as a word line voltage VWL.

The row decoder 360 may select one of the plurality of word lines WL in response to the row address X-ADDR, and may select one of the plurality of string select lines SSL. For example, the row decoder 360 may apply a program voltage and a program verify voltage to a selected word line during the program operation, and may apply a read voltage to the selected word line during the read operation.

FIG. 3 is a view illustrating a 3D V-NAND structure applicable to a storage device according to an example embodiment. In some example embodiments, when a memory device of a storage device is implemented as a 3D V-NAND type flash memory, a plurality of memory blocks constituting the memory device may be respectively represented by an equivalent circuit as illustrated in FIG. 3.

FIG. 3 is a view illustrating a 3D V-NAND structure applicable to a storage device according to an example embodiment.

For example, a plurality of memory NAND strings included in a memory block BLKi may be formed in a direction, perpendicular to the substrate.

Referring to FIG. 3, the memory block BLKi may include a plurality of memory NAND strings NS11 to NS33 connected between bit lines BL1, BL2, and BL3 and a common source line CSL. Each of the plurality of memory NAND strings NS11 to NS33 may include a string select transistor SST, a plurality of memory cells MC1, MC2, ..., MC8, and a ground select transistor GST. Although it is illustrated in FIG. 3 that each of the plurality of memory NAND strings NS11 to NS33 includes eight memory cells MC1, MC2, ..., MC8, the present inventive concepts are not limited thereto.

The string select transistor SST may be connected to string select lines SSL1, SSL2, and SSL3 corresponding thereto. The plurality of memory cells MC1, MC2, ..., MC8 may be respectively connected to gate lines GTL1, GTL2, ..., GTL8 corresponding thereto. The gate lines GTL1, GTL2, ..., GTL8 may correspond to word lines, and a portion of the gate lines GTL1, GTL2, ..., GTL8 may correspond to dummy word lines. The ground select transistor GST may be connected to ground select lines GSL1, GSL2, and GSL3 corresponding thereto. The string select transistor SST may be connected to the bit lines BL1, BL2, and BL3 corresponding thereto, and the ground select transistor GST may be connected to the common source line CSL.

Word lines having the same height (e.g., WL1) may be commonly connected, and the ground selection lines GSL1, GSL2, and GSL3 and the string select lines SSL1, SSL2, and SSL3 may be separated from each other. In FIG. 3, the memory block BLKi is illustrated as being connected to eight gate lines GTL1, GTL2, ..., GTL8 and three bit lines BL1, BL2, BL3, but the present inventive concepts are not necessarily limited thereto.

FIG. 4 is a view illustrating threshold voltage distributions of memory cells according to an example embodiment.

Referring to FIG. 4, in a graph, a horizontal axis indicates a magnitude of a threshold voltage, and a vertical axis indicates the number of memory cells.

In an example embodiment illustrated in FIG. 4, the memory cell may correspond to a multiple level cell (MLC) that stores 2-bit data, but the number of data bits that the memory cell stores is not limited thereto. In some example embodiments, when a memory cell is an MLC, the memory cell may have a threshold voltage corresponding to any one of first to fourth program states P1 to P4. A read voltage set for distinguishing each of the first to fourth program states P1 to P4 may include first to third read voltages Vb1 to Vb3. The first read voltage Vb1 may be a read voltage for distinguishing the first program state P1 and the second program state P2. The second read voltage Vb2 may be a read voltage for distinguishing the second program state P2 and the third program state P3. The third read voltage Vb3 may be a read voltage for distinguishing the third program state P3 and the fourth program state P4.

Distribution of the first to fourth program states P1 to P4 may vary depending on (or based on) an internal temperature of a storage device. For example, the distribution may vary depending on (or based on) a difference between a program temperature of the storage device at a point in time of programming data in the memory block and a read attempt temperature of the storage device at a point in time of reading the programmed data. For example, when the program temperature is higher than the read attempt temperature, a center of the distribution of the first to fourth program states P1 to P4 may move to a left side or a right side, and/or a degree of the distribution of the first to fourth program states P1 to P4 may increase or decrease. As another example, when the program temperature is lower than the read attempt temperature, a center of the distribution of the first to fourth program states P1 to P4 may move to a right side or a left side, and/or a degree of the distribution of the first to fourth program states P1 to P4 may decrease or increase. As another example, as a difference between the program temperature and the read attempt temperature increases, a center of the distribution of the first to fourth program states P1 to P4 may move in a higher magnitude, and/or a degree of the distribution of the first to fourth program states P1 to P4 may be changed in a higher magnitude.

The distribution of the first to fourth program states P1 to P4 may include an overlapping region, and an error bit may occur in the overlapping region to cause data reading to fail. According to an example embodiment, as a difference occurs between the program temperature and the read attempt temperature of the storage device, an overlapping region of the distribution of the first to fourth program states P1 to P4 may increase. For example, the number of a data read failure cases may increase.

A storage device according to an example embodiment may include a temperature sensor measuring an internal temperature of the storage device. For example, the temperature sensor may measure a program temperature at a point in time of programming data in each of the plurality of memory blocks, and a read attempt temperature at a point in time of reading the programmed data. A controller included in the storage device may use the program temperature and the read attempt temperature when determining whether a refresh operation on a memory block failed to read data is performed. For example, it is possible to determine whether a read failure is a temporary read failure of a memory block due to a difference in temperature between the program temperature and the read attempt temperature, to reduce the number of cases to be processed as a bad block.

Figure 5:
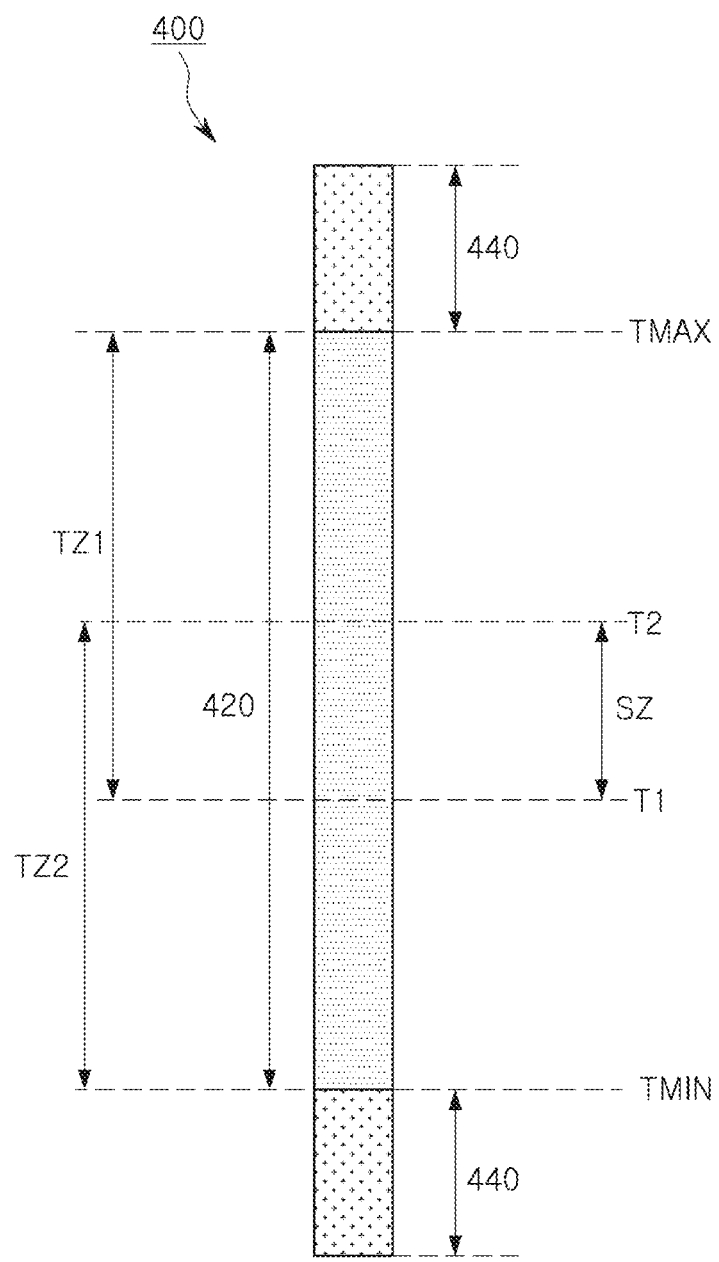
FIG. 5 is a view illustrating a driving temperature range of a storage device according to an example embodiment.

FIG. 5 is a view illustrating a driving temperature range of a storage device according to an example embodiment.

A storage device according to an example embodiment may have a driving temperature range 400, and the driving temperature range 400 may include a driving guarantee temperature range 420 and a driving non-guarantee temperature range 440. The driving guarantee temperature range 420 may correspond to a range of an internal temperature in which the storage device may be normally driven. For example, when the internal temperature of the storage device falls within the driving guarantee temperature range 420, normal driving of the storage device may be guaranteed.

In some example embodiments, when the internal temperature of the storage device is out of the driving guarantee temperature range 420 and falls within the driving non-guarantee temperature range 440, normal driving of the storage device may not be guaranteed. In an example embodiment, a program temperature, which is an internal temperature of the storage device at a point in time of programming data in each of the plurality of memory blocks, and a read attempt temperature, which is an internal temperature of the storage device at a point in time of attempting to read the programmed data, fall within the driving non-guarantee temperature range 440, registration of the corresponding memory block as a bad block may be postponed, and a refresh operation may be performed.

A storage device according to an example embodiment may have a guarantee magnitude. The guarantee magnitude may be compared with a difference in temperature, which may be a difference between the program temperature and the read attempt temperature. In some example embodiments, when the difference in temperature is greater than the guarantee magnitude, bad block processing may be postponed. According to an example embodiment, when reading fails, the corresponding memory block may be registered as a bad block or a refresh operation may be performed on the corresponding memory block, depending on (or based on) a comparison result between the difference in temperature and the guarantee magnitude.

The operating guarantee temperature range 420 may correspond to a temperature range between a highest driving temperature TMAX and a lowest driving temperature TMIN, and the highest driving temperature TMAX may correspond to a temperature higher than the lowest driving temperature TMIN. According to an example embodiment, the driving guarantee temperature range 420 may include a first temperature section TZ1 and a second temperature section TZ2. A magnitude of the first temperature section TZ1 and a magnitude of the second temperature section TZ2 may be the same, and the magnitudes may be guarantee magnitudes. In an example, a guarantee magnitude may be greater than half a magnitude of the driving guarantee temperature range 420.

According to an example embodiment, the first temperature section TZ1 may correspond to a section from the highest driving temperature TMAX to a first temperature T1, and the first temperature T1 may correspond to a temperature lower than the highest driving temperature TMAX by a guarantee magnitude. The second temperature section TZ2 may correspond to a section from the lowest driving temperature TMIN to a second temperature T2, and the second temperature T2 may correspond to a temperature higher than the lowest driving temperature TMIN by a guarantee magnitude.

A storage device according to an example embodiment may have a stable range SZ. The stable range SZ may correspond to a range of an internal temperature of the storage device that does not fail to read data programmed to a memory block. For example, when the program temperature is out of the stable range SZ and the read attempt temperature falls within the stable range SZ, the difference in temperature may always be smaller than the guarantee magnitude. For another example, when the read attempt temperature is out of the stable range SZ and the program temperature falls within the stable range SZ, the difference in temperature may always be smaller than the guarantee magnitude. Therefore, when at least one of the program temperature or the read attempt temperature falls within the stable range SZ, a read failure due to the internal temperature of the storage device may not occur.

The stable range SZ may correspond to a portion of the driving guarantee temperature range 420 and, specifically, may correspond to a region in which the first temperature section TZ1 and the second temperature section TZ2 overlap. For example, when an internal temperature of the storage device at a point in time of programming data falls within the stable range SZ, the temperature may not be stored in the memory device. For example, when an internal temperature of the storage device at a point in time of programming data falls within the stable range SZ and data reading fails, the corresponding data block may be registered as a bad block. Additionally, according to an example embodiment, data reading that failed to be read may be attempted again when the internal temperature of the storage device falls within the stable range SZ.

Figure 6:
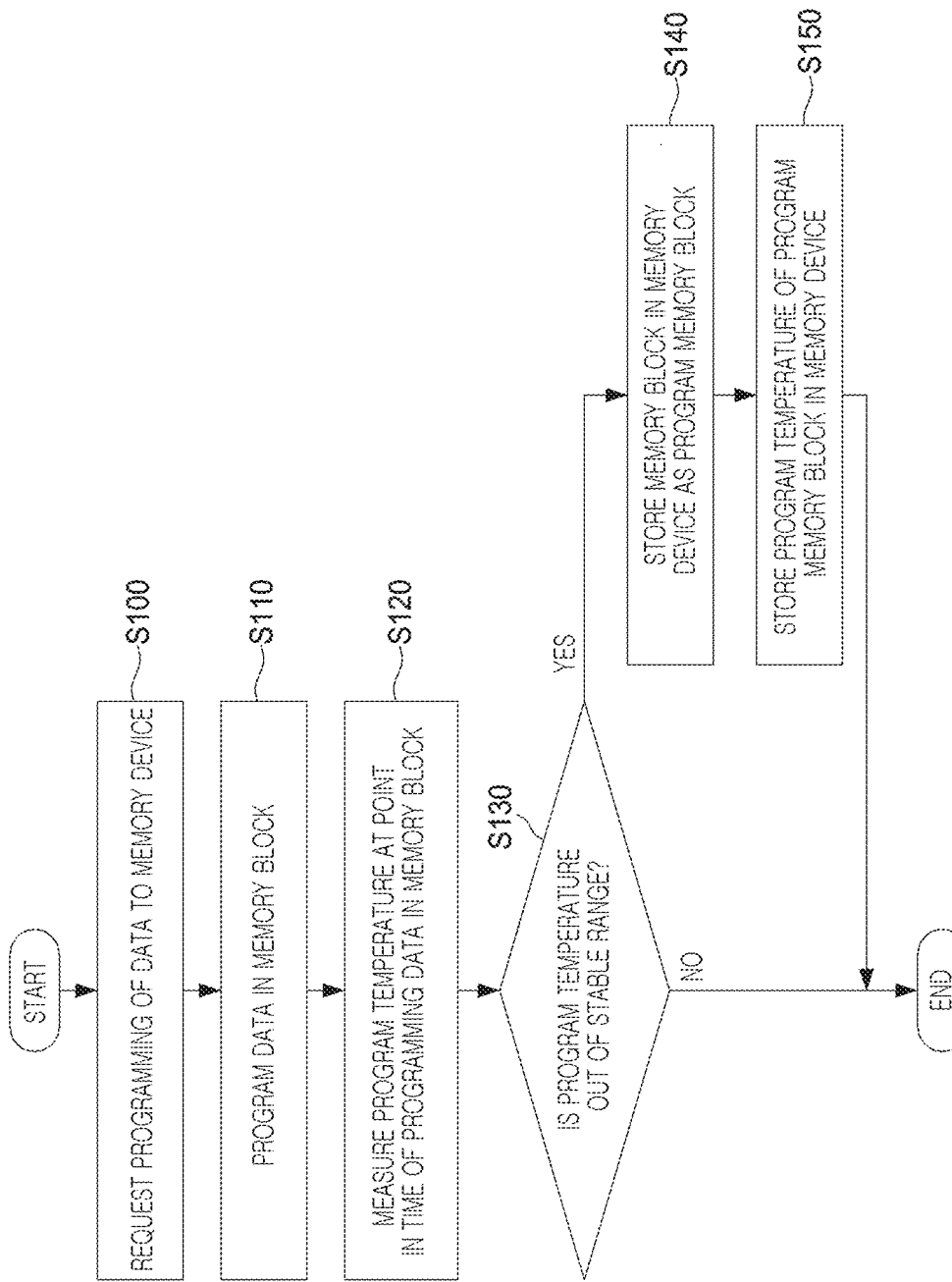
FIG. 6 is a flowchart illustrating a process of programming data in a memory block according to an example embodiment.
Figure 7:
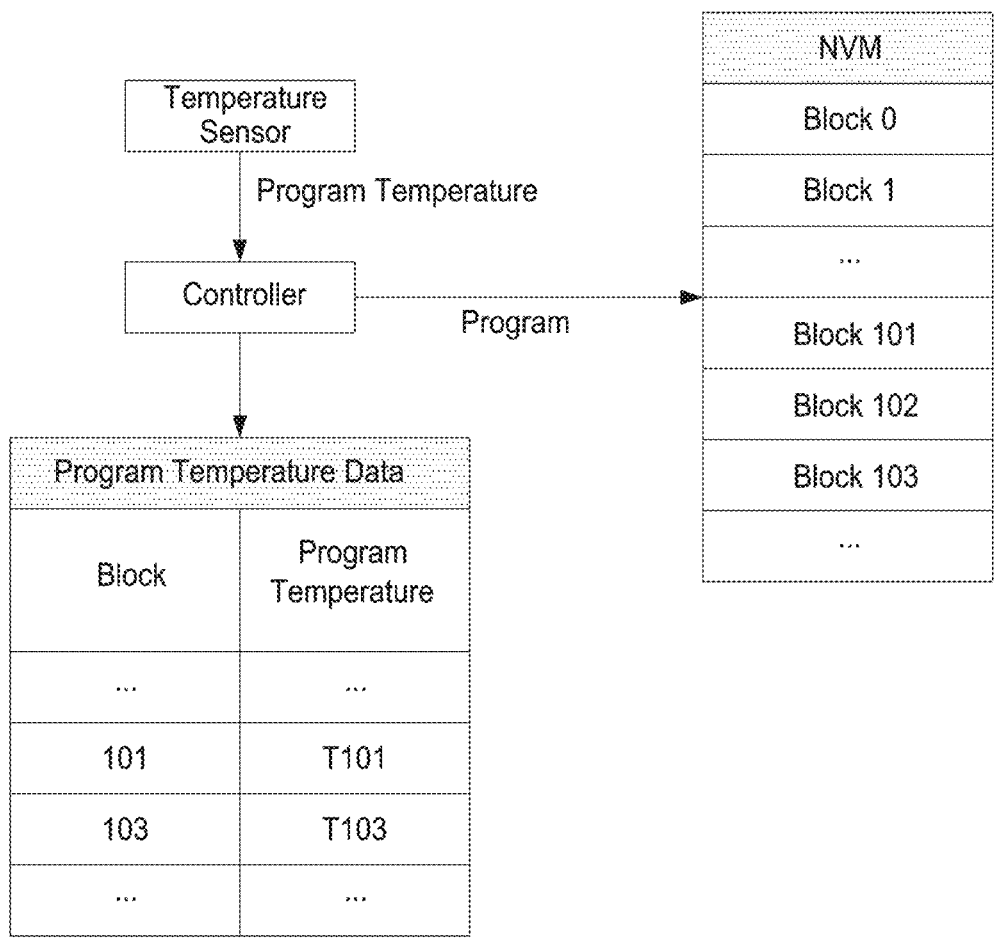
FIG. 7 is a view illustrating storage of a program temperature according to data programming according to an example embodiment.

FIG. 6 is a flowchart illustrating a process of programming data in a memory block according to an example embodiment. FIG. 7 is a view illustrating storage of a program temperature according to data programming according to an example embodiment.

A storage device may include a memory device, a controller, a temperature sensor, and the like. The memory device may include a plurality of memory blocks. The temperature sensor may measure an internal temperature of the storage device, and may transmit the measured temperature to the controller. The controller may control the memory device and the temperature sensor.

According to an example embodiment illustrated in FIG. 6, a host may request programming of data to a memory device (S100). Thereafter, a controller may program the data in a memory block (S110), and the programmed data may correspond to that provided by the host. A temperature sensor may measure a program temperature at a point in time of programming data in the memory block (S120).

According to an example embodiment illustrated in FIG. 6, the controller may determine whether the program temperature is out of a stable range (S130). For example, the stable range may correspond to a portion of a driving guarantee temperature range of a storage device, and some example embodiments of the stable range may be similar to those described in FIG. 5. For example, when the program temperature is not out of the stable range (NO in S130), the process of programming data may be terminated without storing a program temperature of a program memory block.

In some example embodiments, when the program temperature is out of the stable range (YES in S130), the controller may store a memory block of which program temperature is out of the stable range in the memory device as a program memory block (S140), and store a program temperature of the program memory block in the memory device (S150).

In an example embodiment, the program temperature may be higher than the highest driving temperature TMAX illustrated in FIG. 5. For example, the program temperature may fall within a driving non-guarantee temperature range. In some example embodiments, the controller may store the corresponding memory block as a program memory block in the memory device, and the program temperature of the program memory block may be stored in the memory device.

Referring to FIG. 7, a $101^{st}$ memory block to a $103^{rd}$ memory block are illustrated. A controller may store data in a memory device (NVM), and specifically, may program data in a plurality of memory blocks, respectively. In some example embodiments, a temperature sensor may measure a program temperature, which is an internal temperature of a storage device. For example, the controller may program data in each of the 101st to 103rd memory blocks. A program temperature of the 101st memory block may be T101, a program temperature of the 102nd memory block may be T102, and a program temperature of the 103rd memory block may be T103.

According to an example embodiment, when data is programmed multiple times in each of the plurality of memory blocks, the temperature sensor may measure internal temperatures of the storage device at multiple times when the data is programmed. In some example embodiments, the controller may determine the highest value among the measured internal temperatures as a program temperature. For example, when data is programmed in the 101st memory block multiple times, the temperature sensor may measure internal temperatures of the storage device at multiple times when the data is programmed, and the controller may determine T101, which is the highest value among the measured internal temperatures, as a program temperature.

According to an example embodiment, the temperature sensor may transmit a program temperature to the controller. The controller may determine whether the program temperature is out of the stable range. As in an example embodiment described in FIG. 6, the program temperature may be stored only when the program temperature is out of the stable range. For example, a memory block of which program temperature is out of the stable range may be stored as a program memory block, and the program temperature of the program memory block may be stored.

Referring to FIG. 7, program temperature data may be stored to form a table. For example, a program temperature for each program memory block may be stored to form a table. However, the present inventive concepts are not limited thereto, and the program temperature data may be stored to form a queue or a list. For example, as illustrated in FIG. 7, if the controller determines that T101 and T103 are out of the stable range and T102 is not out of the stable range, the 102nd memory block and T102 may not be stored.

Unlike illustrated in FIG. 6, in an example embodiment, the controller may store the program temperature regardless of whether the program temperature is out of the stable range. For example, the operations S130 and S140 of FIG. 6 may be omitted, and a program temperature of the memory block may be stored even when the program temperature does not exceed the stable range. For example, program temperatures measured by the temperature sensor may be stored. For example, unlike what is illustrated in FIG. 7, the 102nd memory block and T102 may be stored as program temperature data.

Figure 8:
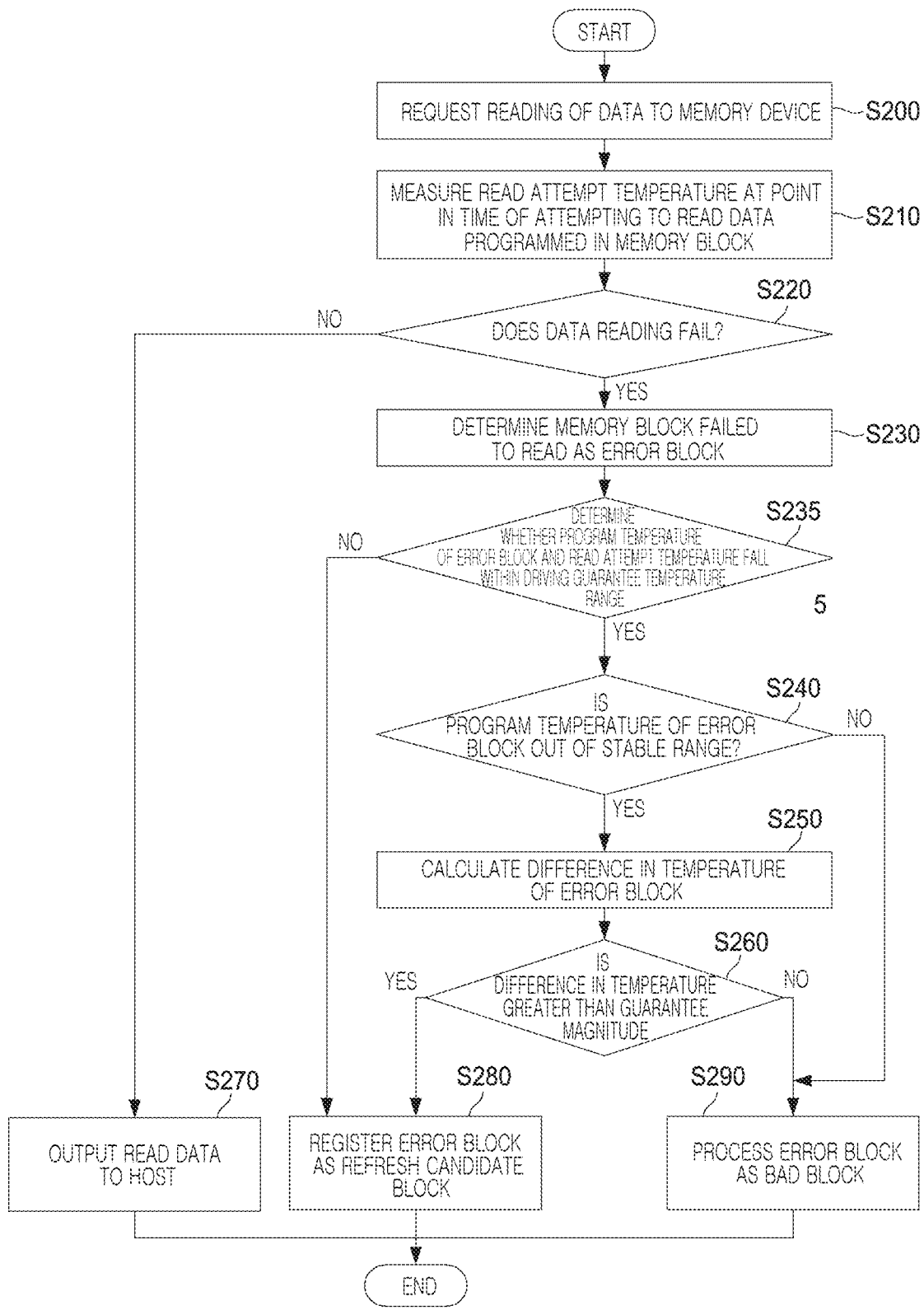
FIG. 8 is a flowchart illustrating a process of reading data from a memory block according to an example embodiment.
Figure 9:
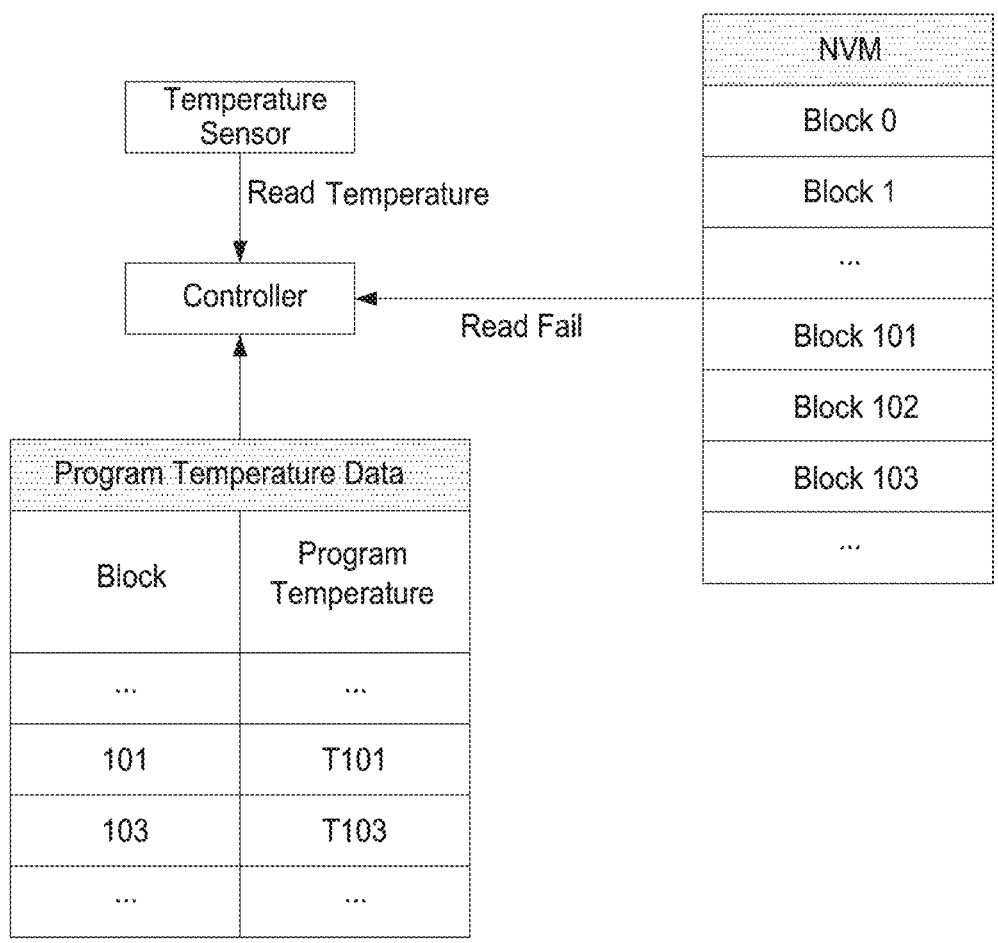
FIG. 9 is a view illustrating output of a program temperature according to a data read failure according to an example embodiment.

FIG. 8 is a flowchart illustrating a process of reading data from a memory block according to an example embodiment. FIG. 9 is a view illustrating output of a program temperature according to a data read failure according to an example embodiment.

A storage device may include a memory device, a controller, a temperature sensor, and the like. The memory device may include a plurality of memory blocks. The temperature sensor may measure an internal temperature of the storage device, and may transmit the measured temperature to the controller. The controller may control the memory device and the temperature sensor.

According to an example embodiment illustrated in FIG. 8, a host may request reading of data programmed in a memory device (S200). A controller may attempt to read data programmed in a memory block, and a temperature sensor may measure a read attempt temperature at a point in time of attempting to read the data programmed in the memory block (S210).

In some example embodiments, when the reading of data does not fail (NO in S220), the controller may output the read data to the host (S270). For example, when the reading of data fails (YES in S220), the controller may determine a memory block failed to read as an error block (S230).

Thereafter, the controller may determine whether a program temperature of the error block and the read attempt temperature fall within a driving guarantee temperature range (S235). For example, a storage device may have a driving guarantee temperature range, and some example embodiments may be similar to those described in FIG. 5. In some example embodiments, when the program temperature of the error block and the read attempt temperature do not fall within the driving guarantee temperature range (NO in S235), the controller may register the error block as a refresh candidate block (S280).

In some example embodiments, when the program temperature of the error block and the read attempt temperature fall within the driving guarantee temperature range (YES in S235), the controller may determine whether the program temperature of the error block is out of a stable range (S240). As in an example embodiment illustrated in FIG. 6, when only a program memory block and a program temperature of a memory block determined as the program memory block is stored, whether the program temperature of the error block is out of the stable range may be determined by whether the error block is included in the program memory block. As in an example embodiment not illustrated in FIG. 6, when all memory blocks and program temperatures are stored, whether the program temperature of the error block is out of the stable range may be determined by whether the stored program temperature is out of the stable range.

In some example embodiments, when the program temperature of the error block does not exceed the stable range (NO in S240), the controller may process the error block as a bad block (S290). Even when a memory block has failed to read, in a memory block of which program temperature is in a stable range, a difference in temperature between the program temperature and the read attempt temperature may not have a value greater than a guarantee magnitude. For example, read failure in this case may not be due to the internal temperature of the storage device. Therefore, a time period required (or used) for processing may be shortened by immediately registering (or by registering) the memory block as a bad block, rather than registering it as a refresh candidate block.

In some example embodiments, when the program temperature of the error block is out of the stable range (YES in S240), the controller may calculate a difference in temperature of the error block (S250), and the difference in temperature may correspond to a difference between the program temperature and the read attempt temperature. The controller may compare the difference in temperature and the guarantee magnitude, and may register the error block as a bad block or a refresh candidate block. For example, the storage device may have the guarantee magnitude, and some example embodiments of the guarantee magnitude may be similar to those described in FIG. 5.

In some example embodiments, when the difference in temperature is smaller than the guarantee magnitude (NO in S260), the controller may process the error block as a bad block (S290). In some example embodiments, when the difference in temperature is greater than the guarantee magnitude (YES of S260), the controller may register the error block as a refresh candidate block (S280).

Referring to FIG. 9, a $101^{st}$ memory block to a $103^{rd}$ memory block are illustrated. A controller may attempt to read data programmed in a memory device (NVM), and specifically, may attempt to read data programmed in a plurality of memory blocks, respectively. In some example embodiments, a temperature sensor may measure a read attempt temperature, which is an internal temperature of a storage device. According to an example embodiment, the temperature sensor may transmit the read attempt temperature to the controller. For example, the controller may attempt to read data programmed in each of the $101^{st}$ to $103^{rd}$ memory blocks.

According to an example embodiment, when the controller fails to read the data, a memory block corresponding thereto may be determined as an error block. The controller may calculate a difference in temperature only for error blocks where a program temperature and the read attempt temperature fall within a driving guarantee temperature range, and the program temperature is out of a stable range.

For example, in an error block included in a program memory block, the controller may calculate the difference in temperature using the stored program temperature data and the read attempt temperature. As illustrated in FIG. 9, only the program memory block and the program temperature of the program memory block may be stored as the program temperature data. Therefore, the difference in temperature may be calculated only for error blocks of which program temperature is out of the stable range.

As another example, in an error block in which the program temperature is out of the stable range, the controller may calculate the difference in temperature using the stored program temperature data and the read attempt temperature. Unlike illustrated in FIG. 9, the program temperature data may include all memory blocks and program temperatures of all memory blocks. For example, the $102^{nd}$ memory block and T102 may be stored in the program temperature data. Therefore, the difference in temperature may be calculated after determining whether a program temperature of the error block is out of the stable range.

The controller may determine whether the difference in temperature is greater than the guarantee magnitude, and depending on (or based on) a result therefrom, the error block may be registered as a refresh candidate block or a bad block.

Figure 10:
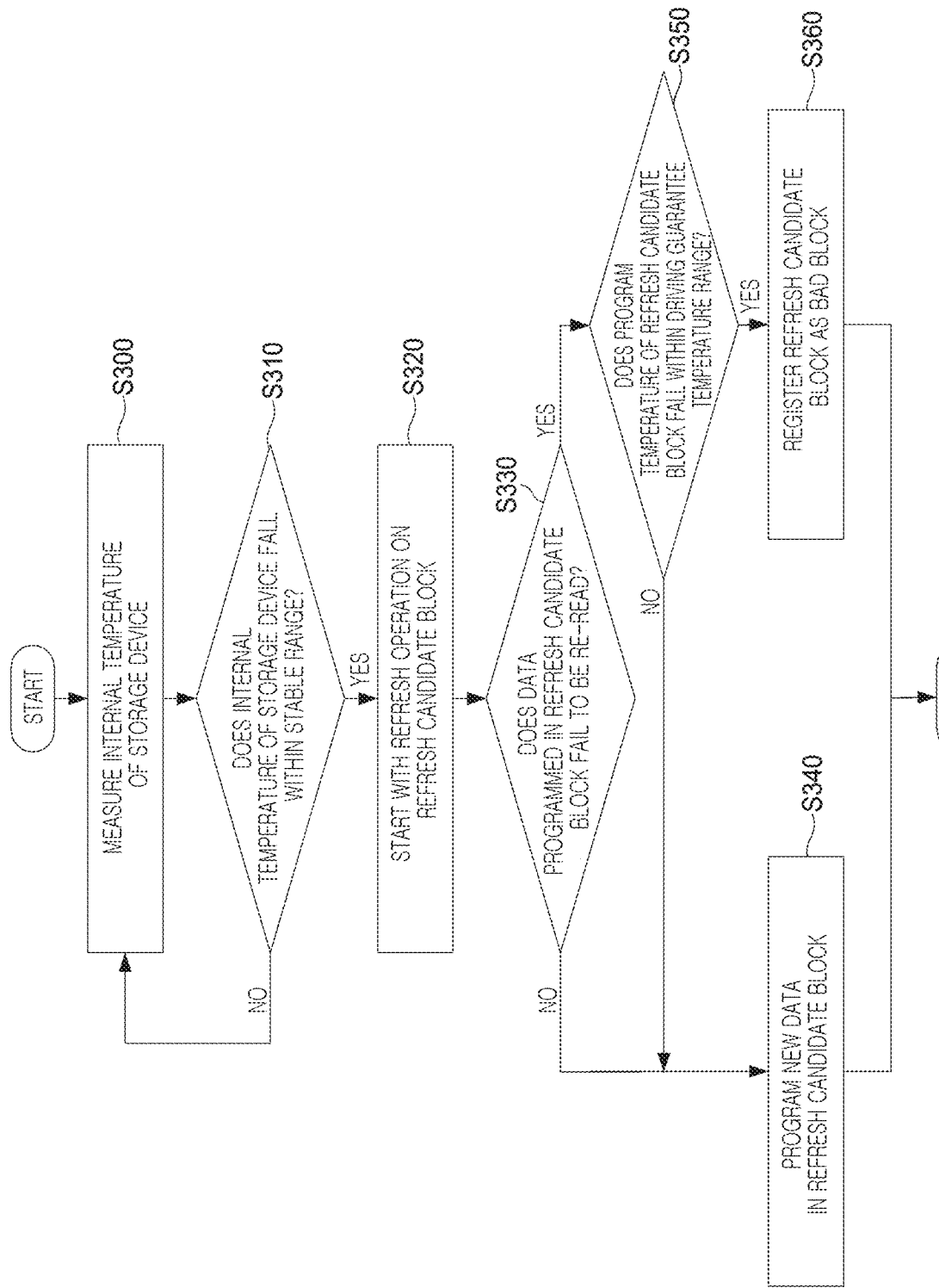
FIG. 10 is a flowchart illustrating a process of performing a refresh operation on a memory block according to an example embodiment.

FIG. 10 is a flowchart illustrating a process of performing a refresh operation on a memory block according to an example embodiment.

A storage device may include a memory device, a controller, a temperature sensor, and the like. The memory device may include a plurality of memory blocks. The temperature sensor may measure an internal temperature of the storage device, and may transmit the measured temperature to the controller. The controller may control the memory device and the temperature sensor.

Operations illustrated in FIG. 10 may be performed on a refresh candidate block. An operation of determining whether a block corresponds to a refresh candidate block may be similar to the example embodiments previously described in FIG. 8. According to an example embodiment, a refresh operation may be started on a refresh candidate block when an internal temperature of a storage device may be within a stable range. Thereafter, a controller may determine whether data programmed in the refresh candidate block is re-read and whether a program temperature of the refresh candidate block falls within a driving guarantee temperature range. Depending on (or based on) determination results, new data may be programmed in the refresh candidate block, or the refresh candidate block may be registered as a bad block.

First, a temperature sensor may measure an internal temperature of a storage device (S300). A controller may determine whether the internal temperature of the storage device falls within a stable range (S310). For example, the stable range may correspond to a portion of a driving guarantee temperature range of the storage device, and some example embodiments of the stable range may be similar to those described in FIG. 5.

In some example embodiments, when the internal temperature of the storage device does not fall within the stable range (NO in S310), the temperature sensor may repeat the operation of measuring the internal temperature of the storage device (S300). For example, when the internal temperature of the storage device falls within the stable range (YES in S310), the controller may start with a refresh operation on a refresh candidate block (S320). The refresh operation may be performed by the operations S330 to S360 illustrated in FIG. 10. For example, the refresh operation may include an operation of re-reading data programmed in the refresh candidate block to re-program the data to a reserved block, and an operation of programming new data in the refresh candidate block.

In some example embodiments, when data programmed in the refresh candidate block does not fail to be re-read (NO in S330), the controller may program new data in the refresh candidate block (S340). For example, the refresh candidate block may be reused without registering the same as a bad block, unnecessary use of a reserved block may be prevented (or reduced). In some example embodiments, when the data programmed in the refresh candidate block fails to be re-read (YES in S330), the controller may determine whether a program temperature of the refresh candidate block falls within a driving guarantee temperature range (S350). In some example embodiments, when the program temperature of the refresh candidate block does not fall within the driving guarantee temperature range (NO in S350), new data may be programmed in the refresh candidate block.

In some example embodiments, when the program temperature of the refresh candidate block falls within the driving guarantee temperature range (YES in S350), the controller may register the refresh candidate block as a bad block (S360). In an example embodiment, the controller may transmit the data programmed in the refresh candidate block to a new block. For example, the new block may correspond to a reserved block, and data loss may be prevented (or reduced) through the transmission process of the programmed data. Afterwards, no more data may be programmed in the refresh candidate block.

Below, a structure of a memory device to which the present inventive concepts are applied, and an example of a system to which the present inventive concepts are applied will be described with reference to FIGS. 11 and 12.

Figure 11:
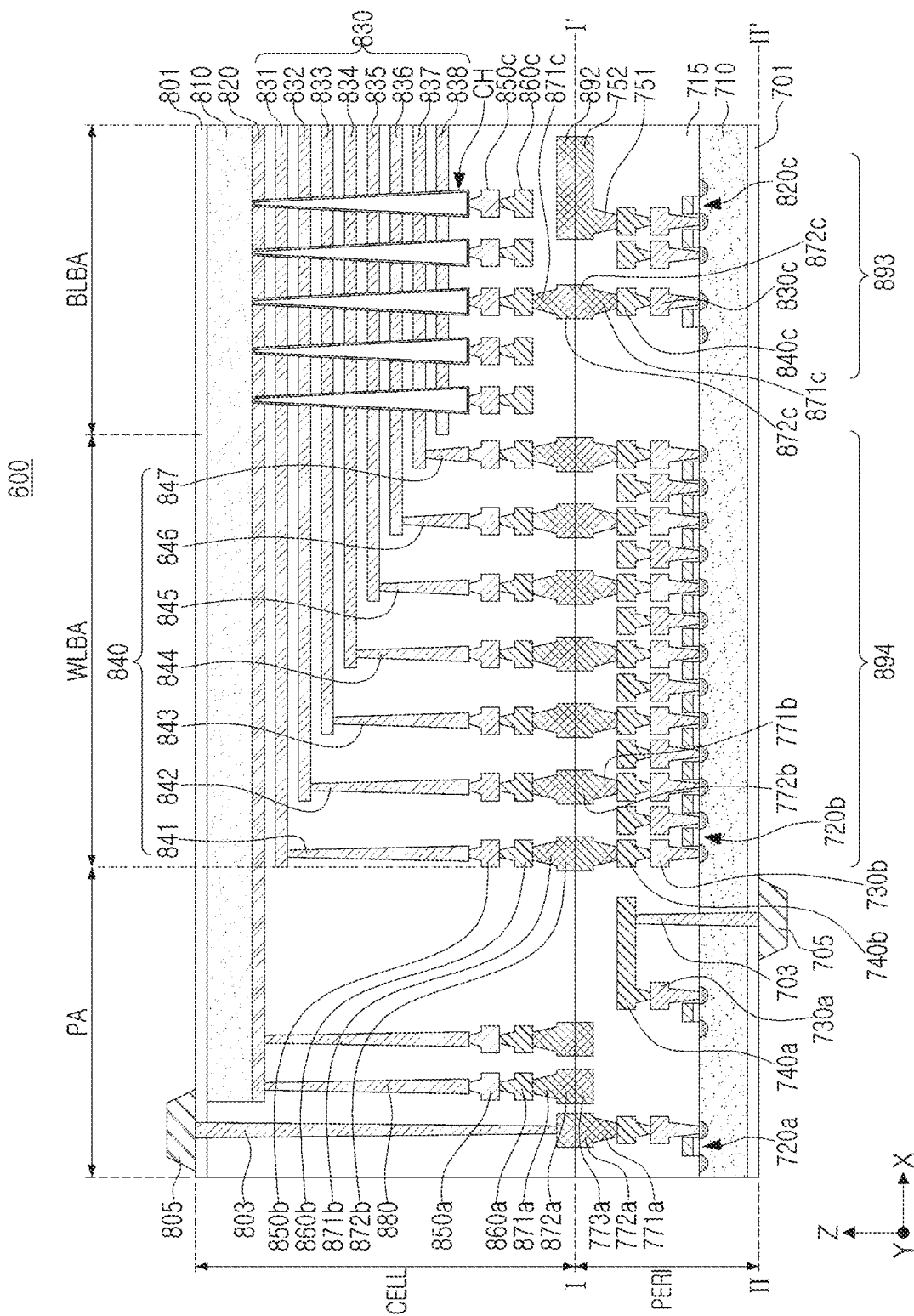
FIG. 11 is a view illustrating a memory device according to an example embodiment.

FIG. 11 is a view illustrating a memory device according to an example embodiment.

Referring to FIG. 11, a memory device 600 may have a chip-to-chip (C2C) structure. The C2C structure may refer to a structure formed by manufacturing an upper chip including a cell region CELL on a first wafer, manufacturing a lower chip including a peripheral circuit region PERI on a second wafer, different from the first wafer, and then bonding the upper chip and the lower chip to each other by a bonding process. For example, the bonding process may refer to a method of electrically connecting a bonding metal formed on an uppermost metal layer of the upper chip and a bonding metal formed on an uppermost metal layer of the lower chip. For example, when the bonding metal is formed of copper (Cu), the bonding method may be a Cu—Cu bonding method, and the bonding metal may also be formed of aluminum or tungsten.

Each of the peripheral circuit region PERI and the cell region CELL of the memory device 600 may include an external pad bonding area PA, a word line bonding area WLBA, and a bit line bonding area BLBA. The peripheral circuit region PERI may include a first substrate 710, an interlayer insulating layer 715, a plurality of circuit elements 720a, 720b, and 720c formed on the first substrate 710, a first metal layer (730a, 730b, and 730c) respectively connected to the plurality of circuit elements 720a, 720b, and 720c, and a second metal layer (740a, 740b, and 740c) formed on the first metal layer (730a, 730b, and 730c). In an example embodiment, the first metal layer (730a, 730b, and 730c) may be formed of tungsten having relatively high electrical resistivity, and the second metal layer (740a, 740b, and 740c) may be formed of copper having relatively low electrical resistivity.

In some example embodiments, only the first metal layer (730a, 730b, and 730c) and the second metal layer (740a, 740b, and 740c) are illustrated and described, but example embodiments are not limited thereto, and at least one or more metal layers may be further formed on the second metal layer (740a, 740b, and 740c). At least a portion of the one or more metal layers formed on the second metal layer (740a, 740b, and 740c) may be formed of aluminum or the like having a lower resistance than copper forming the second metal layer (740a, 740b, and 740c).

The interlayer insulating layer 715 may be disposed on the first substrate 710 to cover the plurality of circuit elements 720a, 720b, and 720c, the first metal layer (730a, 730b, and 730c), and the second metal layer (740a, 740b, and 740c), and may include an insulating material such as silicon oxide, silicon nitride, or the like.

A lower bonding metal (771b and 772b) may be formed on the second metal layer 740b in the word line bonding area WLBA. In the word line bonding area WLBA, the lower bonding metal (771b and 772b) in the peripheral circuit region PERI may be electrically bonded to an upper bonding metal (871b and 872b) of the cell region CELL. The lower bonding metal (771b and 772b) and the upper bonding metal (871b and 872b) may be formed of aluminum, copper, tungsten, or the like. The upper bonding metal (871b and 872b) of the cell region CELL may be referred to as first metal pads, and the lower bonding metal (771b and 772b) of the peripheral circuit region PERI may be referred to as second metal pads.

The cell region CELL may include at least one memory block. The cell region CELL may include a second substrate 810 and a common source line 820. On the second substrate 810, a plurality of word lines 831 to 838 (e.g., 830) may be stacked in a direction (the Z-axis direction), perpendicular to an upper surface of the second substrate 810. A string select line and a ground select line may be arranged on and below the plurality of word lines 830, respectively, and the plurality of word lines 830 may be disposed between the at least one string select line and the at least one ground select line.

In the bit line bonding area BLBA, a channel structure CH may extend in a direction, perpendicular to the upper surface of the second substrate 810, and may pass through the plurality of word lines 830, the string select line, and the ground select line. The channel structure CH may include a data storage layer, a channel layer, a buried insulating layer, and the like, and the channel layer may be electrically connected to a first metal layer 850c and a second metal layer 860c. For example, the first metal layer 850c may be a bit line contact, and the second metal layer 860c may be a bit line. In an example embodiment, the bit line may extend in the first direction (the Y-axis direction), parallel to the upper surface of the second substrate 810.

In the example embodiment illustrated in FIG. 11, an area in which the channel structure CH, the bit line, and the like are disposed may be defined as the bit line bonding area BLBA. In the bit line bonding area BLBA, the bit line may be electrically connected to the circuit elements 720c providing a page buffer 893 in the peripheral circuit region PERI. The bit line may be connected to upper bonding metals 871c and 872c in the peripheral circuit region PERI, and the upper bonding metals 871c and 872c may be connected to a lower bonding metal (771c and 772c) connected to the circuit elements 720c of the page buffer 893.

In the word line bonding area WLBA, the word lines 830 may extend in a second direction (the X-axis direction), parallel to the upper surface of the second substrate 810 and perpendicular to the first direction, and may be connected to a plurality of cell contact plugs 841 to 847 (e.g., 840). The plurality of word lines 830 and the plurality of cell contact plugs 840 may be connected to each other in pads provided by at least a portion of the plurality of word lines 830 extending in different lengths in the second direction. A first metal layer 850b and a second metal layer 860b may be connected to an upper portion of the plurality of cell contact plugs 840 connected to the plurality of word lines 830, sequentially. The plurality of cell contact plugs 840 may be connected to the peripheral circuit region PERI by the upper bonding metal (871b and 872b) of the cell region CELL and the lower bonding metal (771b and 772b) of the peripheral circuit region PERI in the word line bonding area WLBA.

The cell contact plugs 840 may be electrically connected to the circuit elements 720b forming a row decoder 894 in the peripheral circuit region PERI. In an example embodiment, operating voltages of the circuit elements 720b of the row decoder 894 may be different than operating voltages of the circuit elements 720c forming the page buffer 893. For example, operating voltages of the circuit elements 720c forming the page buffer 893 may be greater than operating voltages of the circuit elements 720b forming the row decoder 894.

A common source line contact plug 880 may be disposed in the external pad bonding area PA. The common source line contact plug 880 may be formed of a conductive material such as a metal, a metal compound, polysilicon, or the like, and may be electrically connected to the common source line 820. A first metal layer 850a and a second metal layer 860a may be stacked on an upper portion of the common source line contact plug 880, sequentially. For example, an area in which the common source line contact plug 880, the first metal layer 850a, and the second metal layer 860a are disposed may be defined as the external pad bonding area PA.

Input/output pads 705 and 805 may be disposed in the external pad bonding area PA. Referring to FIG. 11, a lower insulating film 701 covering a lower surface of the first substrate 710 may be formed below the first substrate 710, and a first input/output pad 705 may be formed on the lower insulating film 701. The first input/output pad 705 may be connected to at least one of the plurality of circuit elements 720a, 720b, and 720c disposed in the peripheral circuit region PERI through a first input/output contact plug 703, and may be separated from the first substrate 710 by the lower insulating film 701. In some example embodiments, a side insulating film may be disposed between the first input/output contact plug 703 and the first substrate 710 to electrically separate the first input/output contact plug 703 and the first substrate 710.

Referring to FIG. 11, an upper insulating film 801 covering the upper surface of the second substrate 810 may be formed on the second substrate 810, and a second input/output pad 805 may be disposed on the upper insulating layer 801. The second input/output pad 805 may be connected to at least one of the plurality of circuit elements 720a, 720b, and 720c disposed in the peripheral circuit region PERI through a second input/output contact plug 803.

In some example embodiments, the second substrate 810 and the common source line 820 may not be disposed in a region in which the second input/output contact plug 803 is disposed. Also, the second input/output pad 805 may not overlap the word lines 830 in the third direction (the Z-axis direction). Referring to FIG. 11, the second input/output contact plug 803 may be separated from the second substrate 810 in a direction, parallel to the upper surface of the second substrate 810, and may pass through an interlayer insulating layer 815 of the cell region CELL to be connected to the second input/output pad 805.

In some example embodiments, the first input/output pad 705 and the second input/output pad 805 may be selectively formed. For example, the memory device 600 may include only the first input/output pad 705 disposed on the first substrate 710, or may include only the second input/output pad 805 disposed on the second substrate 810. Alternatively, the memory device 600 may include both the first input/output pad 705 and the second input/output pad 805.

A metal pattern provided on an uppermost metal layer may be provided as a dummy pattern or the uppermost metal layer may be absent, in each of the external pad bonding area PA and the bit line bonding area BLBA, respectively included in the cell region CELL and the peripheral circuit region PERI.

In the external pad bonding area PA, the memory device 600 may include a lower metal pattern 773a, corresponding to an upper metal pattern 872a formed in an uppermost metal layer of the cell region CELL, and having the same cross-sectional shape as the upper metal pattern 872a of the cell region CELL to be connected to each other, in an uppermost metal layer of the peripheral circuit region PERI. In the peripheral circuit region PERI, the lower metal pattern 773a formed in the uppermost metal layer of the peripheral circuit region PERI may not be connected to a contact. Similarly, in the external pad bonding area PA, an upper metal pattern, corresponding to the lower metal pattern formed in an uppermost metal layer of the peripheral circuit region PERI, and having the same shape as the lower metal pattern of the peripheral circuit region PERI, may be formed in an uppermost metal layer of the cell region CELL.

The lower bonding metal (771b and 772b) may be formed on the second metal layer 740b in the word line bonding area WLBA. In the word line bonding area WLBA, the lower bonding metal (771b and 772b) of the peripheral circuit region PERI may be electrically connected to the upper bonding metal (871b and 872b) of the cell region CELL by bonding.

Further, in the bit line bonding area BLBA, an upper metal pattern 892, corresponding to a lower metal pattern 752 formed in the uppermost metal layer of the peripheral circuit region PERI, and having the same cross-sectional shape as the lower metal pattern 752 of the peripheral circuit region PERI, may be formed in an uppermost metal layer of the cell region CELL. A contact may not be formed on the upper metal pattern 892 formed in the uppermost metal layer of the cell region CELL.

In some example embodiment, a reinforced metal pattern, corresponding to a metal pattern formed on the uppermost metal layer of one of the cell region CELL or the peripheral circuit region PERI, and having the same cross-sectional shape as a metal pattern formed on the uppermost metal layer of the other one of the cell region CELL or the peripheral circuit region PERI, may be formed. A contact may not be formed in the reinforced metal pattern.

According to an example embodiment, a storage device may include a memory device 600 and a temperature sensor. The memory device 600 may include a plurality of memory blocks that store data, and the temperature sensor may measure an internal temperature of the storage device. For example, when data programmed in each of the plurality of memory blocks fails to be read, a refresh operation may be performed by determining whether read failure is temporary. Specifically, by determining whether the read failure is temporary using a condition of the internal temperature of the storage device, it is possible to determine whether to perform a refresh operation on a memory block corresponding thereto. For example, when the read failure is temporary, determination as a bad block may be postponed and the refresh operation may be performed to reuse the memory device 600, to improve a lifespan thereof.

Figure 12:
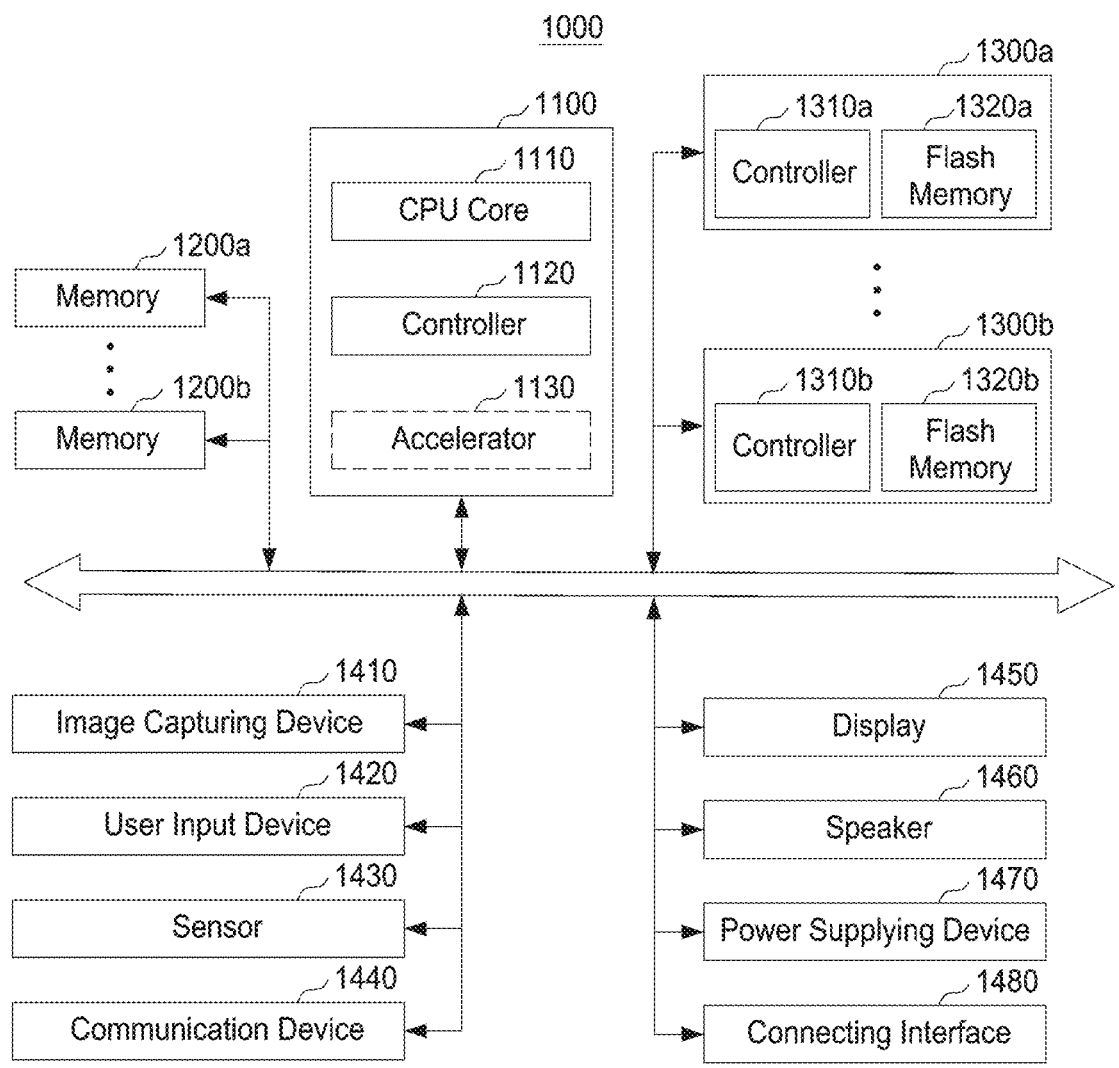
FIG. 12 is a view illustrating a system to which a storage device according to an example embodiment is applied.

FIG. 12 is a view illustrating a system to which a storage device according to an example embodiment is applied.

The system 1000 of FIG. 12 may be basically a mobile system, such as a mobile phone, a smartphone, a tablet personal computer (PC), a wearable device, a healthcare device, or an internet-of-things (IOT) device, but example embodiments are not limited thereto. The system 1000 of FIG. 12 is not necessarily limited to the mobile system, and may be for a vehicle such as a personal computer, a laptop computer, a server, a media player, an automotive device such as a navigation system, or the like.

Referring to FIG. 12, the system 1000 may include a main processor 1100, memories 1200a and 1200b, and storage devices 1300a and 1300b, and may further include at least one of an image capturing device 1410, a user input device 1420, a sensor 1430, a communication device 1440, a display 1450, a speaker 1460, a power supplying device 1470, or a connecting interface 1480.

The main processor 1100 may control an overall operation of the system 1000, and more specifically, operations of other components constituting the system 1000. The main processor 1100 may be implemented as a general-purpose processor, a dedicated processor, an application processor, or the like.

The main processor 1100 may include at least one CPU core 1110, and may further include a controller 1120 for controlling the memories 1200a and 1200b and/or the storage devices 1300a and 1300b. According to an example embodiment, the main processor 1100 may further include an accelerator 1130 that may be a dedicated circuit for high-speed data operation such as artificial intelligence (AI) data operation or the like. The accelerator 1130 may include a graphics processing unit (GPU), a neural processing unit (NPU), and/or a data processing unit (DPU), or the like, and may be implemented as a separate chip, physically independent from other components of the main processor 1100.

The memories 1200a and 1200b may be used as a main memory device of the system 1000, and may include volatile memories such as SRAM and/or DRAM, or the like, but may also include non-volatile memories such as flash memory, PRAM, and/or RRAM, or the like. The memories 1200a and 1200b may be implemented together with the main processor 1100 in the same package.

The storage devices 1300a and 1300b may function as non-volatile storage devices that store data regardless of whether power is supplied or not, and may have a relatively larger storage capacity, as compared to the memories 1200a and 1200b. The storage devices 1300a and 1300b may include storage controllers 1310a and 1310b, and non-volatile memories (NVM) 1320a and 1320b for storing data under control of the storage controllers 1310a and 1310b. The non-volatile memories 1320a and 1320b may include a flash memory having a 2D (2-dimensional) structure or a 3D (3-dimensional) vertical NAND (V-NAND) structure, but may include other types of non-volatile memory such as PRAM and/or RRAM, or the like.

The storage devices 1300a and 1300b may be included in the system 1000 in a state physically separated from the main processor 1100, or may be implemented together with the main processor 1100 in the same package. In addition, the storage devices 1300a and 1300b may have a shape such as a solid state device (SSD) or a memory card, to be detachably coupled to other components of the system 1000 through an interface such as a connecting interface 1480 to be described later. Such storage devices 1300a and 1300b may be devices to which standard protocols such as a universal flash storage (UFS), an embedded multi-media card (eMMC), or a non-volatile memory express (NVMe) are applied, but the present inventive concepts are not necessarily limited thereto.

Storage devices 1300a and 1300b according to an example embodiment may include a temperature sensor. The temperature sensor may measure an internal temperature of the storage devices 1300a and 1300b. For example, when read failure occurs in a memory block of the storage devices 1300a and 1300b, it is possible to determine whether the read failure is temporary read failure using information of the internal temperature. For example, when the read failure is temporary read failure, the storage devices 1300a and 1300b may perform a refresh operation on the memory block and reusing the same, instead of treating the memory block as a bad block, to improve a lifespan thereof.

The image capturing device 1410 may capture a still image or a moving image, and may be a camera, a camcorder, and/or a webcam, or the like.

The user input device 1420 may receive various types of data of the system 1000, input by a user, and may be a touch pad, a keypad, a keyboard, a mouse, and/or a microphone, or the like.

The sensor 1430 may detect various types of physical quantities that may be acquired from the outside of the system 1000, and may convert the sensed physical quantities into electrical signals. Such a sensor 1430 may be a temperature sensor, a pressure sensor, an illuminance sensor, a position sensor, an acceleration sensor, a biosensor, and/or a gyroscope sensor, or the like.

The communication device 1440 may transmit and receive signals between other devices outside the system 1000 according to various communication protocols. Such a communication device 1440 may be implemented to include an antenna, a transceiver, and/or a modem, or the like.

The display 1450 and the speaker 1460 may function as output devices that respectively output visual information and auditory information to the user of the system 1000.

The power supplying device 1470 may appropriately convert power supplied from a battery (not illustrated) mounted in the system 1000 and/or an external power source, and may supply the converted power to each of the components of the system 1000.

The connecting interface 1480 may provide a connection between the system 1000 and an external device that may be connected to the system 1000 and may exchange data with the system 1000. The connecting interface 1480 may be implemented in various interface methods such as an advanced technology attachment (ATA), a serial ATA (SATA), an external SATA (e-SATA), a small computer small interface (SCSI), a serial attached SCSI (SAS), a peripheral component interconnection (PCI), a PCI express (PCIe), NVMe, IEEE 1394, a universal serial bus (USB), a secure digital (SD) card, a multi-media card (MMC), an eMMC, a UFS, an embedded universal flash storage (eUFS), a compact flash (CF) card interface, or the like.

According to an example embodiment, when reading data stored in a memory block fails, it may be determined whether a temporary read failure is due to an internal temperature of a storage device. A lifespan of a memory device may be improved by reusing memory blocks determined as the temporary read failure, rather than treating the same as a bad block, to reduce consumption of a reserved block.

Various advantages and effects of the present inventive concepts are not limited to the above-described contents, and can be more easily understood through description of some example embodiments.

One or more of the elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While some example embodiments have been illustrated and described above, it will be apparent to those skilled in the art that modifications and variations could be made without departing from the scope of the present inventive concepts as defined by the appended claims.

What is claimed is:

1. A storage device comprising:
a memory device including a plurality of memory blocks;
a temperature sensor configured to measure an internal temperature of the storage device; and
a controller configured to control the memory device and the temperature sensor, wherein
the temperature sensor is configured to measure a program temperature at a time of programming data in each of the plurality of memory blocks by the controller, and
the controller is configured to store, in the memory device, the program temperature of at least one program memory block,
wherein the at least one program memory block is a memory block of the plurality of memory blocks of which the program temperature is out of a stable range, and
wherein the stable range corresponds to a range of a driving temperature range of the storage device that does not fail to read data programmed to the at least one program memory block by the controller,
wherein the controller is further configured to,
determine at least one memory block failed to read the data programmed in each of the plurality of memory blocks, as an error block, wherein
in response to the program temperature of the error block and a read attempt temperature at a time of attempting to read the data programmed in the error block falling within a driving guarantee temperature range, and the error block not being included in the at least one program memory block, the controller is further configured to register the error block as a bad block, and
in response to the program temperature of the error block and the read attempt temperature falling within the driving guarantee temperature range, and the error block being included in the at least one program memory block, the controller is further configured to calculate a difference in temperature between the program temperature of the error block and the read attempt temperature, and compare the difference in the temperature and a guarantee magnitude to register the error block as a bad block or a refresh candidate block,
wherein the driving guarantee temperature range comprises a highest driving temperature and a lowest driving temperature within the driving temperature range of the storage device, and further comprises a first temperature section that is based on the highest driving temperature and a second temperature section that is based on the lowest driving temperature, and
wherein the guarantee magnitude is a temperature value based on the driving guarantee temperature range.

2. The storage device of claim 1, wherein the driving guarantee temperature range corresponds to a temperature range in which the storage device is normally driven, and
wherein the stable range corresponds to a portion of the driving guarantee temperature range.

3. The storage device of claim 2,
wherein the first temperature section corresponds to a section between the highest driving temperature and a temperature lower than the highest driving temperature by the guarantee magnitude, and
wherein the second temperature section corresponds to a section between the lowest driving temperature and a temperature higher than the lowest driving temperature by the guarantee magnitude.

4. The storage device of claim 3, wherein the guarantee magnitude is greater than half a magnitude of the driving guarantee temperature range.

5. The storage device of claim 4, wherein the stable range corresponds to a region in which the first temperature section and the second temperature section overlap.

6. The storage device of claim 1, wherein, in response to data being programmed multiple times to each of the plurality of memory blocks,
the temperature sensor is configured to measure internal temperatures of the storage device at a plurality of points in time in response to the data being programmed, and
the controller is configured to determine a highest value among the measured internal temperatures as the program temperature.

7. The storage device of claim 1, wherein the controller is configured to process the error block as the bad block, in response to the difference in temperature being smaller than the guarantee magnitude.

8. The storage device of claim 1, wherein the controller is configured to register the error block as the refresh candidate block, in response to the difference in temperature being greater than the guarantee magnitude or in response to the program temperature of the error block and the read attempt temperature being out of the driving guarantee temperature range.

9. The storage device of claim 8, wherein the controller is configured to start with a refresh operation on the refresh candidate block to re-read data programmed in the refresh candidate block, in response to the internal temperature of the storage device falling within the stable range.

10. The storage device of claim 9, wherein the controller is configured to:
register the refresh candidate block as the bad block, in response to data programmed in the refresh candidate block failing to be re-read and the program temperature of the refresh candidate block falling within the driving guarantee temperature range, and
program new data in the refresh candidate block of the plurality of memory blocks, in response to data programmed in the refresh candidate block failing to be re-read and the program temperature of the refresh candidate block being out of the driving guarantee temperature range.

11. The storage device of claim 9, wherein the controller is configured to program new data in the refresh candidate block of the plurality of memory blocks, in response to data programmed in the refresh candidate block succeeding to be re-read.

12. A storage device comprising:
a memory device including a plurality of memory blocks;
a temperature sensor configured to measure an internal temperature of the storage device; and
a controller configured to control the memory device and the temperature sensor, program data in each of the plurality of memory blocks, and read the data programmed to each of the plurality of memory blocks,
wherein the temperature sensor is configured to measure a program temperature at a time of programming the data to each of the plurality of memory blocks, and a read attempt temperature at a point in time of attempting to read the data programmed to each of the plurality of memory blocks, and
wherein the controller is further configured to,
program the program temperature in the memory device,
determine at least one memory block that failed to read, among the plurality of memory blocks, as an error block, to calculate a difference in temperature between the program temperature of the error block and the read attempt temperature,
register the error block as a bad block or refresh the error block as a refresh candidate block, based on a difference in the temperature and a guarantee magnitude and whether the program temperature of the error block and the read attempt temperature fall within a driving guarantee temperature range, and
start with a refresh operation on the refresh candidate block to re-read data programmed in the refresh candidate block, in response to the internal temperature of the storage device falling within a stable range,
wherein the driving guarantee temperature range comprises a highest driving temperature and a lowest driving temperature within a driving temperature range of the storage device, and further comprises a first temperature section that is based on the highest driving temperature and a second temperature section that is based on the lowest driving temperature, and
wherein the guarantee magnitude is a temperature value based on the driving guarantee temperature range.

13. The storage device of claim 12, wherein the driving guarantee temperature range corresponds to a temperature range in which the storage device is normally driven,
wherein the first temperature section corresponds to a section between the highest driving temperature and a temperature lower than the highest driving temperature by the guarantee magnitude, and
wherein the second temperature section corresponds to a section between the lowest driving temperature and a temperature higher than the lowest driving temperature by the guarantee magnitude.

14. The storage device of claim 13, wherein the guarantee magnitude is greater than half a magnitude of the driving guarantee temperature range, and
wherein the stable range corresponds to a region in which the first temperature section and the second temperature section overlap.

15. The storage device of claim 14, wherein, in response to data being programmed multiple times to each of the plurality of memory blocks,
the temperature sensor is configured to measure internal temperatures of the storage device at a plurality of points in time in response to the data being programmed, and
the controller is further configured to determine a highest value among the measured internal temperatures as the program temperature.

16. The storage device of claim 12, wherein the controller is further configured to:
register the error block as the bad block, in response to the difference in the temperature being smaller than the guarantee magnitude, and
register the error block as the refresh candidate block, in response to the difference in the temperature being greater than the guarantee magnitude or in response to the program temperature of the error block and the read attempt temperature being out of the driving guarantee temperature range.

17. The storage device of claim 16, wherein the controller is further configured to register the refresh candidate block as the bad block, in response to data programmed in the refresh candidate block failing to be re-read and the program temperature of the refresh candidate block falling within the driving guarantee temperature range.

18. The storage device of claim 16, wherein the controller is further configured to program new data in the refresh candidate block of the plurality of memory blocks, in response to data programmed in the refresh candidate block failing to be re-read and the program temperature of the refresh candidate block being out of the driving guarantee temperature range.

19. A method of controlling a storage device, comprising:
measuring a program temperature that is an internal temperature of the storage device at a time of programming data in a program target block among a plurality of memory blocks included in a memory device;

programming the program temperature as a temperature of the program target block, in the memory device, in response to the program temperature being out of a stable range;

measuring a read attempt temperature that is the internal temperature of the storage device at a time of attempting to read data programmed in a read target block among the plurality of memory blocks;

determining the read target block as an error block, and determining whether the program temperature of the error block and the read attempt temperature fall within a driving guarantee temperature range, in response to the data programmed in the read target block failing to be read;

calculating a difference in temperature between the program temperature of the error block and the read attempt temperature, and comparing the difference in the temperature with a guarantee magnitude, wherein the driving guarantee temperature range comprises a highest driving temperature and a lowest driving temperature within a driving temperature range of the storage device, and further comprises a first temperature section that is based on the highest driving temperature and a second temperature section that is based on the lowest driving temperature, and the guarantee magnitude is a temperature value based on the driving guarantee temperature range;

registering the error block as a bad block, in response to the difference in the temperature being smaller than the guarantee magnitude, and registering the error block as a refresh candidate block, in response to the difference in the temperature being greater than the guarantee magnitude, or the program temperature of the error block and the read attempt temperature being out of the driving guarantee temperature range; and starting with a refresh operation on the refresh candidate block, to register the refresh candidate block as a bad block or to program new data in the refresh candidate block, according to a result of re-reading data programmed in the refresh candidate block, in response to the internal temperature of the storage device falling within the stable range.

20. The method of claim 19, wherein the registering the refresh candidate block as the bad block or the programming new data in the refresh candidate block comprises:

processing the refresh candidate block as the bad block, in response to data programmed in the refresh candidate block failing to be re-read and the program temperature of the refresh candidate block falling within the driving guarantee temperature range; and programming new data in the refresh candidate block of the plurality of memory blocks, in response to data programmed in the refresh candidate block failing to be re-read, and the program temperature of the refresh candidate block being out of the driving guarantee temperature range, or data programmed in the refresh candidate block succeeding to be re-read.

* * * * *